United States Patent [19]

Sowman

[11] Patent Number: 5,017,316
[45] Date of Patent: May 21, 1991

[54] INTERNALLY MODIFIED CERAMIC FIBER

[75] Inventor: Harold G. Sowman, Stillwater, Minn.

[73] Assignee: Minnesota Mining and Manufacturing Company, St. Paul, Minn.

[21] Appl. No.: 252,820

[22] Filed: Oct. 3, 1988

Related U.S. Application Data

[62] Division of Ser. No. 830,651, Feb. 18, 1986, Pat. No. 4,797,378.

[51] Int. Cl.$^5$ .............................................. C04B 35/00
[52] U.S. Cl. ........................................ 264/60; 264/65; 264/177.11; 264/211.11; 501/95; 501/12
[58] Field of Search ................. 264/60, 210.8, 211.14, 264/211.11, 177.11, DIG. 19, DIG. 26, DIG. 36, 65, 211.11; 501/35, 95, 12

[56] References Cited

U.S. PATENT DOCUMENTS

| | | | |
|---|---|---|---|
| 2,313,296 | 3/1943 | Lamesch | 49/92 |
| 2,968,622 | 1/1961 | Whitehurst | 501/95 XX |
| 3,385,915 | 5/1968 | Hamling | 164/0.5 |
| 3,632,709 | 1/1972 | Hayes et al. | 264/63 |
| 3,663,182 | 5/1972 | Hamling | 23/355 |
| 3,709,706 | 1/1973 | Sowman | 106/57 |
| 3,795,524 | 3/1974 | Sowman | 106/65 |
| 3,996,145 | 12/1974 | Hepburn | 501/95 XX |
| 4,047,966 | 9/1977 | Karst | 106/65 |
| 4,101,615 | 7/1978 | Horikiri et al. | 501/95 X |
| 4,166,147 | 8/1979 | Lange et al. | 428/328 |
| 4,547,420 | 10/1985 | Krueger et al. | 428/229 |
| 4,707,399 | 11/1987 | Rambosek | 428/225 |
| 4,713,300 | 12/1987 | Sowman et al. | 428/547 |
| 4,757,036 | 7/1988 | Kaar et al. | 501/95 |
| 4,824,623 | 4/1989 | Rambosek | 501/95 X |

FOREIGN PATENT DOCUMENTS

| | | |
|---|---|---|
| 0171289 | 2/1986 | European Pat. Off. . |
| 52-114727 | 9/1977 | Japan . |
| 7015245 | 10/1970 | Netherlands . |
| 1287288 | 12/1968 | United Kingdom . |
| 1402544 | 8/1975 | United Kingdom . |
| 1403863 | 8/1975 | United Kingdom . |

OTHER PUBLICATIONS

"Inorganic Fibres and Composite Materials," Chap. 4, edited by Bracke et al., published by Pergamon Press, NY, N.Y. (1984).

*Primary Examiner*—Karl Group
*Attorney, Agent, or Firm*—Gary L. Griswold; Walter N. Krin; Lorraine R. Sherman

[57] ABSTRACT

A multicomponent ceramic article which can be a fiber or particle comprises a continuous ceramic matrix phase and at least one in situ-generated discontinuous ceramic or metal phase. Particles can include shapes in the form of beads, flakes, granules, and microspheres.

22 Claims, 1 Drawing Sheet

INTERNALLY MODIFIED CERAMIC FIBER

This is a division of application Ser. No. 06/830,651 filed Feb. 18, 1986 U.S. Pat. No. 4,797,378.

FIELD OF THE INVENTION

This invention relates to an internally modified multicomponent ceramic fiber comprising a continuous ceramic phase and at least one discontinuous phase. In another aspect, it relates to a process for preparing ceramic fibers from a blend of two distinct precursor liquids.

BACKGROUND ART

Within the last decade, an amount of literature has been published describing various polycrystalline, microcrystalline, or non-vitreous fibers and other shaped articles of refractory metal oxides. These articles are formed by various non-melt processes, such as by drying films of solutions of oxygen-containing metal compounds, or drying organic polymeric bodies, such as cellulose or rayon, impregnated with such a solution, or by extruding and drawing, or spinning, viscous fluids of such metal compounds into fibers. The fibers are then heated to remove water, organic material, and other volatile material to produce a refractory article. A review of the state of the art of polycrystalline inorganic fibers appears in Chapter 4 of Bracke, H. et al., "Inorganic Fibers and Composite Materials", published by Pergamon Press, New York, (1984). Other art in this area is Netherlands Pat. No. 7,015,245, British Pat. No. 1,287,288, U.S. Pat. Nos. 3,385,915, 3,632,709, 3,663,182 and the art cited in U.S. Pat. No. 3,709,706. Oxide fibers other than those identified as fiberglass are still in the relatively early stage of development.

Bicomponent fibers are known in the textile art. U.S. Pat. No. 2,313,296 teaches bicomponent sheath and core fibers or filaments of glass.

It is well-known in the art to prepare monocomponent ceramic fibers from spinning sols. For example, alumina-silica fibers are disclosed in U.S. Pat. No. 4,047,965; alumina-boria-silica fibers are taught in U.S. Pat. No. 3,795,524; titanium dioxide fibers are disclosed in U.S. Pat. No. 4,166,147; zirconia-silica fibers are disclosed in U.S. Pat. No. 3,709,706.

SUMMARY OF THE INVENTION

Briefly, the present invention provides a multicomponent ceramic article which can be a fiber or particle comprising a continuous ceramic matrix phase and at least one in situ-generated discontinuous ceramic or metal phase. Particles can include shapes in the form of beads, flakes, granules, and microspheres.

The discontinuous phase can be any metal (e.g. Ni, Fe, Co, Cu, etc. or combinations thereof) or ceramic (e.g. FeO, $Al_2O_3$, $ZrO_2$, etc.).

In another aspect, a spinning process is provided for forming a ceramic fiber from an emulsion of two or more precursor systems. One of the precursor systems is a spinnable matrix composition with a second phase dispersed therein. To form the fiber, the emulsion is extruded through spinnerette orifices to form a multicomponent fiber comprising a continuous ceramic phase and at least one in situ-generated discontinuous ceramic or metal phase.

The ceramic multicomponent fibers of the present invention are made by a non-melt process comprising shaping a viscous concentrate which is an emulsion of at least two immiscible precursor liquids into a fiber form and then dehydratively or evaporatively gelling or hydrolyzing the drawn or spun fibers to result in "green" non-refractory fibers. Heating and firing the shaped green fiber removes water, decomposes and volatilizes undesired constituents, and converts it into the refractory fiber of the invention.

In this application:

"ceramic" means inorganic nonmetallic material consolidated by the action of heat, such as metal and nonmetal oxides, carbides, nitrides, sulfides, etc.

"continuous ceramic matrix phase" means a homogeneous ceramic phase in which can be embedded at least one dissimilar metallic or ceramic material, the dissimilar phase having a diameter in the range of 1 to 3 micrometers;

"cermet" means a mixture of ceramic and metallic materials;

"sol" means an aqueous solution or dispersion of metal or nonmetal oxides, sulfides, nitrides or carbides;

"non-vitreous" means not derived from a melt of the total oxide composition;

"non-melt" means not formed from the liquid-fused oxide composition, but from the precursors thereof;

"polycrystalline" means a phase which gives a discernible X-ray powder diffraction pattern. Crystallite size will affect the line width of the X-ray diffraction pattern:

"microcrystalline" means a crystalline phase having a crystallite or grain size of about 50 Å to 1000 Å ($5 \times 10^{-9}$ to $1 \times 10^{-7}$ m) and sometimes larger, but always less than 10,000 Å ($1 \times 10^{-6}$ m). Such a microcrystalline structure may be transparent, providing the material itself is not opaque or contains opaque fillers and the like. Many microscrystalline ceramics are transparent or translucent;

"amorphous" means a material having a diffuse X-ray diffraction pattern without definite lines to indicate the presence of a crystalline component;

"dehydrative gelling" or "evaporative gelling", mean that sufficient water and volatile material are removed from the shaped green fibers so that the form or shape of the fiber is sufficiently rigid to permit handling or processing without significant loss or distortion of the desired fibrous form or shape. All the water in the shaped fiber need not be removed.

"green" refers to the ceramic articles which are unfired, uncalcined, untreated or incompletely treated, that is, not in their final ceramic form and having a heterogeneous microstructure;

"phase" means a homogeneous substance that exists as a distinct and separate portion or portions in a heterogeneous system; and "heterogeneous" means not of uniform composition.

DETAILED DESCRIPTION

Figure 1:
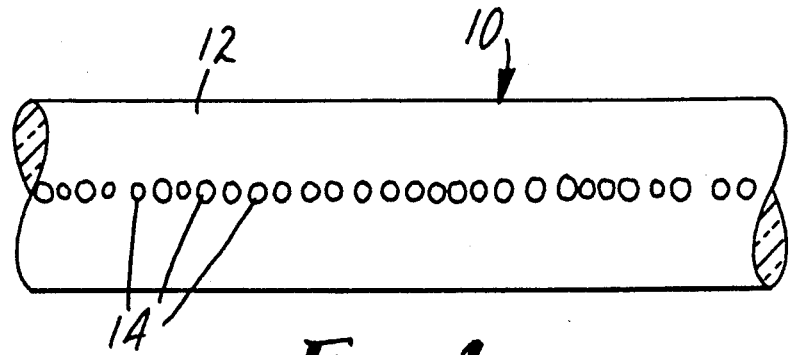
FIGS. 1, 2, 3, 4, and 5 show enlarged elevational views of 5 embodiments of articles of the present invention.
Figure 2:
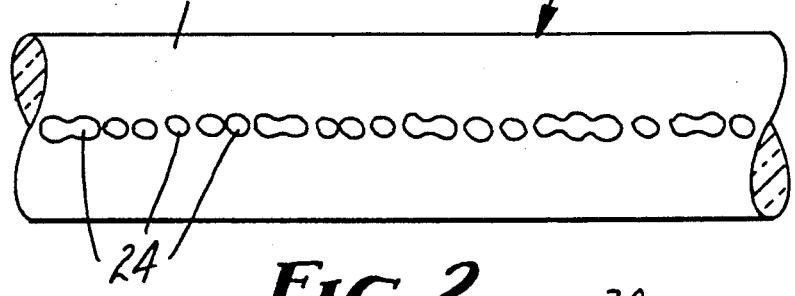
Figure 3:
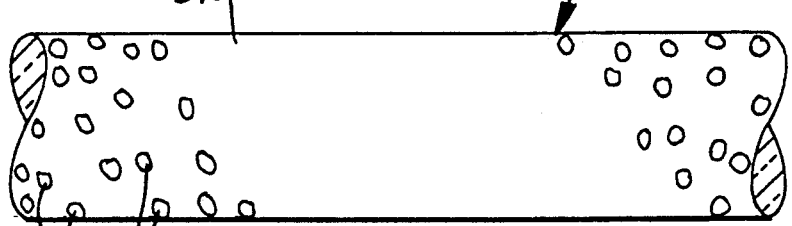
Figure 4:
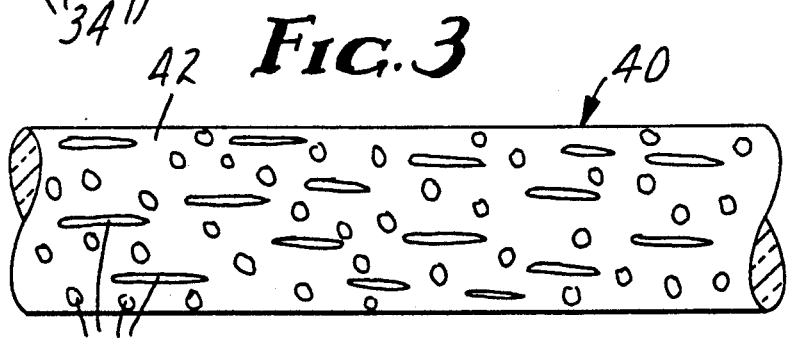
Figure 5:
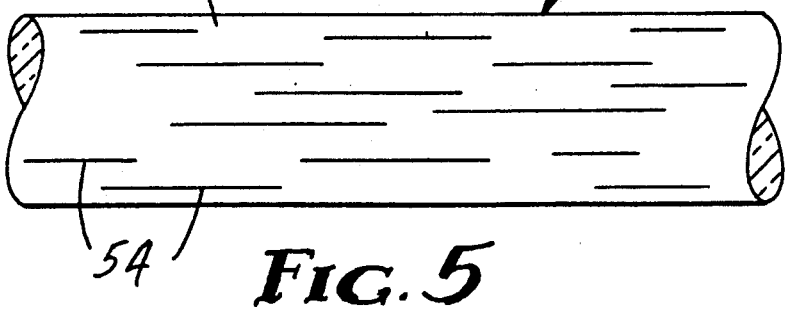

Referring to FIGS. 1 to 5, five different fibers of the invention are shown. FIG. 1 shows fiber 10 having continuous ceramic matrix phase 12 and a discontinuous phase 14 in the form of a "string" of pearls. FIG. 2 depicts fiber 20 having a continuous ceramic matrix phase 22 and a discontinuous phase 24 which is a string of beads and rod-like particles. FIG. 3 shows fiber 30 having a continuous ceramic phase 32 and dispersed therein a discontinuous phase 34 of randomly arranged beads and elongated particles. FIG. 4 shows fiber 40 having continuous ceramic matrix phase 42 and dispersed therein a discontinuous phase 44 of randomly arranged elongated ovoid and rod-like particles. FIG. 5 shows fiber 50 having continuous ceramic matrix phase 52 and discontinuous phase of fibrils 54.

The multicomponent ceramic fibers of the present invention comprise a continuous ceramic matrix first phase and at least one in situ-generated discontinuous second phase, the second phase having a diameter of at least 1 micrometer. Preferably the discontinuous second phase is a metal such as Ni, Fe, Co, Cu, W, Mo, Cr, or combinations thereof, or a ceramic phase such as iron oxide, alumina, or zirconia. When particles are present, the second phase can be present in an amount in the range of 0.05 to 50 weight percent. When the second phase is fibers, it preferably is present in an amount in the range of 0.05 to 10 weight percent, more preferably 0.05 to 3 weight percent.

The fiber which has a heterogeneous composition and structure is prepared from a spinning sol which is a system comprising at least two immiscible liquid precursor compositions. Prior to spinning, the two compositions are blended together so that one is an emulsion in the other. After spinning, the second phase can have varying shapes, e.g., beads, rods, fibrils, fibers, or anything in between, such as tear-drop shape, etc.

For the second phase to be in the shape of fibers, the viscosity or rheology of the second phase should be similar to that of the matrix phase in the precursor form.

For the second phase to be in the shape of droplets or beads, dissimilar viscosity or rheological properties of the two phases are preferred.

When the second phase is not miscible with the ceramic matrix there will be a tendency for the second phase to bead up into spherical globules.

Two general preparatory methods are used to form the fibers of the invention:

1) Components, in sol or solution form, are blended together, one sol precursor liquid system for each component, the solvent of one being immiscible with that of the other. The emulsified components are concentrated down to a fiber-forming consistency (i.e., when a rod is inserted and pulled out, a fiber is formed). To facilitate spinning of continuous matrix fibers, it is preferable that the concentrate has a viscosity in the range of 50,000 to 100,000 cps. For spinning of staple form fibers (as by use of spinning discs or blowing processes) much lower viscosities, i.e., down to 10,000 cps, are useable.

2) In some cases, it may be preferable to concentrate the matrix fiber system followed by the blending of the modifying phase precurser therein by mechanical mixing processes.

Subsequent spinning, drawing, and firing then provide the internally modified fibers.

The continuous ceramic matrix of the fiber can be any refractory ceramic fiber known in the art. Ceramic matrices of fibers can be made from precursor liquids for zirconia, silica, alumina, titania, chromia, and thoria, and the like, as individual sols, or in combination, for example, as aluminum borosilicate.

Preparation of aqueous liquid mixtures, sols, or dispersible colloids or mixtures thereof for individual components of the matrix fibers of the invention are disclosed, for example, as follows:

| Fiber matrices | U.S. Pat. Nos. |
| --- | --- |
| titania | 4,166,147 |
| alumina-chromia-metal (IV) oxide | 4,125,406 |
| alumina-silica | 4,047,965 |
| thoria-silica-metal (III) oxide | 3,909,278 |
| alumina-boria and alumina-boria-silica | 3,795,524 |
| zirconia-silica | 3,793,041 |
| zirconia-silica | 3,709,706 |

In the case where aqueous systems are used as precursors for the continuous phase, the discontinuous metal phase can be derived from metal-containing organic precursors such as napthanates and octoates dissolved in hydrocarbon solvents such as mineral spirits as the carrier liquid. The spinning sol contains the emulsion droplets in highly concentrated form with metal organics as the droplets. Higher viscosity sols will form fibers (fibrils) whereas lower viscosity sols form spheres and tear drops. An alternate to the higher concentration of metal organics in the emulsion droplets is to add a low molecular weight hydrocarbon polymer (e.g., polybutadiene) to the metal solution to enhance the fiber-forming quality for fibers within a fiber.

In one embodiment, the starting material used to prepare the refractory matrix fiber of this invention can be prepared by admixing an aqueous silica sol with an aqueous solution or dispersion of an aluminum compound and, where used, other oxide precursors, such as boron and phosphorus compounds, to obtain a uniform dispersion without formation of a gel. If desired, a compatible heat fugitive acid, such as acetic or nitric acid, can be added to the silica sol to acidify the same prior to use and prevent premature gelling. Compatible heat fugitive organic agents can be incorporated as adjuvants in the fiber starting material to improve shelf-life of the subsequently concentrated dispersion or to improve the fiberizing nature of the latter. Such organic agents representatively include polyvinylpyrrolidone, polyvinyl alcohol, lactic acid, glucose (e.g. corn syrup), and mixtures thereof, these additives being oxidized and removed during the firing of the green fibers produced from such systems.

The aqueous solutions or disperions which are used to make the refractory matrix fibers of this invention optionally can also contain various other water-miscible metal compounds (calcinable to metal oxide) or sols which will impart additional desired properties to the refractory fibers. For example, an optional compound can be used to reduce weight loss, adjust refractive index or increase the modulus of elasticity.

When the second phase contains a reducible metal oxide, reduction in a hydrogen atmosphere will convert the oxide particles to metal particles of similar shape. A cermet fiber results. For example, a ferric oxide-containing refractory can be reduced in a hydrogen atmosphere, the resulting reduced iron oxide or iron imparting a black color to the refractory and making it attractive to a magnet.

The amount of such other optional metal oxide in the refractory matrix component can vary, depending upon the property effect desired, but generally will be an amount in the range of as low as 0.05 to 0.5 to as high as 10 weight percent, preferably as high as 3 weight percent, based on the total weight of the component in the refractory fiber. The larger amounts of optional metal oxide additive may cause the fibers to become friable or give rise to contamination problems when the fibers are used in a particular environment. Where these other metal oxides are to be used in fibers having a boria component derived from boric acid, the precursors of the other metal oxides should be other than chlorides if they are used in significant amounts since the combination of boric acid and high chloride levels (which can be determined empirically) in the starting material can result in frangible fibers.

The matrix fiber precursor materials, as initially prepared, will be a relatively dilute liquid, generally containing about 10 to 30 weight percent equivalent oxide or carbide solids, which can be calculated from a knowledge of the equivalent solids in the raw materials and the amounts thereof used, or determined by calcining samples of the raw materials or fiber starting material. For the preparation of fibers, it is necessary to concentrate or viscosify the dilute liquid in order to convert it to a viscous or syrupy fluid concentrate which will readily gel when the concentrate is fiberized and dehydrated, for example when the concentrate is extruded and drawn in air to form fibers. The concentration step can be carried out by techniques known in the art. e.g., see said U.S. Pat. No. 3,795,524. Sufficient concentration will be obtained when the equivalent solids content is generally in the range of 25 to 55 (as determined by calcining a sample of the concentrate), and viscosities (Brookfield at ambient room temperature) are in the range of 15,000 to 1,000,000 cps (centipoises) preferably 45,000 to 100,000 cps, depending on the type of fiberizing or dehydrative gelling technique and apparatus used and the desired shape of gelled fiber. High viscosities tend to result in fibers which are circular in cross-section whereas low viscosities (e.g., less than 50,000 cps) tend to result in fibers which are oval or rod-like (elongated ovoid) in cross-section.

In the process for preparing the internally-modified, multicomponent fiber, a spinning precursor composition can comprise an emulsion of immiscible aqueous or organic solutions, sols, or mixtures thereof, which are prepared as is known in the art; see for example, U.S. Pat. Nos. 3,795,524 and 4,047,965. After concentration to a viscous, fiberizable concentrate, the precursor liquid composition is spun through the orifices of a spinnerette. The multicomponent fiber is spun from the dies, which can have a multiplicity of orifices, into a drying tower from which they are collected and fired. The process is well described above and in U.S. Pat. No. 3,760,049. In the alternative, multicomponent fibers can be prepared by a method described in U.S. Pat. No. 4,101,615 in which the green fibers are spun from fiberizable organic solutions, followed by hydrolysis, and subsequent calcination to the ceramic form.

In making continuous fibers with at least one discontinuous phase therein, the concentrated viscous emulsion can be extruded through a plurality of orifices (e.g., 30 to 400) from a stationary head and the resulting green fibers allowed to fall in air by the force of gravity or drawn mechanically in air by means of drawing rolls or a drum or winding device at a speed faster than the rate of extrusion. The concentrate can also be extruded through orifices from a stationary or rotating head and blown by parallel, oblique or tangential streams of air, such as in the making of cotton candy, the resulting blown green fibers being in staple form or short form with lengths generally 25 cm or less (rather than in long or continuous form) and collected on a screen or the like in the form of a mat. Any of these forces exerted on the extruded, green fibers, e.g., gravity, drawing, or air streams, cause attenuation or stretching of the fibers, reducing their diameter by about 50 to 90 percent or more and increasing their length by about 300 to 10,000 percent or more and serving to hasten or aid the drying of the green fibers.

The dehydrative gelling of the green fibers can be carried out in ambient air, or heated air can be used if desirable or necessary to obtain fast drying. The drying rate assists in controlling of the shape of the fiber. It has been found that too rapid drying may cause distortion of the shape of the fiber. The relative humidity of such air should be controlled since large amounts of moisture will cause the gelled or shaped green fibers to stick together, and excessively dry atmosphere can lead to fiber breakage. Generally, air with relative humidity in the range of 20 to 60 percent can be used, at temperatures of 15° to 30° C., though such air can be heated subsequently to about 70° C. or higher. In some cases, for example, where continuous green fibers are made and gathered together in parallel alignment or juxtaposition in the form of a multi-fiber strand, the fibers or strand can be treated with a size to prevent the fibers from sticking together.

Further detail in fiberizing the viscous concentrate will be omitted here in the interest of brevity since such procedures are now known, e.g., see said U.S. Pat. No. 3,760,049.

The fibers in their green or unfired gel form generally comprise about 25 to 60 weight percent equivalent oxide or carbide solids (as determined by calcining a sample) and are dry in the sense that they do not adhere or stick to one another or other substrates and feel dry to the touch. But the "dry" fibers still contain substantial amounts of water and organic material, e.g., 40 to 75 weight percent, and it is necessary to calcine or fire the green fibers in order to remove further water and organic material and convert the fibers into refractory fibers. The term "dehydrative gelling" (or "evaporative gelling"), as used herein, therefore does not mean that all the water in the green fibers is removed. Thus, in a sense, this step can be called partial dehydrative gelling. The green fibers are relatively strong enough for further processing and can be collected and fired without significant breakage.

In order to remove the balance of water and organic material from the green fibers and convert them to refractory fibers, they are calcined in a furnace or kiln (preferably an electric resistance furnace), this heating being carried out usually in air or other oxidizing atmosphere at temperatures below the fusion or melting point of the ceramic mixture and usually at about 800° C., or higher if desired, e.g., to 1400° C. Calcination can be accomplished in a number of ways, for example by heating in a single step from a low or room temperature to a desired elevated temperature (e.g., from room temperture to 1000° C. in 20–60 minutes or more) or by heating in a series of steps at progressively higher temperatures, with or without cooling or storage between steps.

When the second phase is added to the precursor mix as a metal sol, it may be desirable to fire or calcine in an inert or reducing atmosphere without prior firing in an oxidizing atmosphere. It may be desirable to fire this resultant cermet fiber in air to oxidize to an oxide fiber.

The green fibers can be calcined in a batch or continuous manner in an oriented form, such as strands or continous yarn (a plurality of untwisted or slightly twisted parallel-aligned, virtually endless, continuous fibers) or hanks (continuous fibers or strands in coiled form), or tows (group of continuous fibers without definite twist and collected in loose form) or calcined in an irregular or random order, such as a mat of intermeshed, mechanically interlocked or tangled fibers, or calcined in the form of staple fiber.

In firing the green fibers, care should be exercised to avoid ignition of combustible material in or evolved from the fibers, for example, by controlling the firing atmosphere or by starting out at a low temperature, e.g., room temperature, and then elevating the temperature at a slow rate, since such ignition may cause the formation of opaque, fragile fibers. If the green fibers are not to be fired completely in one operation or are not to be fired immediately or soon after their formation, it may be desirable or necessary to store the green fibers in a relatively dry or protective atmosphere to prevent them from picking up moisture or contaminants and deteriorating or sticking together.

The green fibers in their continuous form are preferably gathered or collected in the form of a strand, the strand then accumulated in a re)axed, loose, unrestrained configuration of offset or superimposed loops (as in a "figure 8") on a substrate and calcined in that configuration. The strand is thereafter pulled in a straight or linear form through a furnace at higher temperature, to produce refractory strands, a plurality of which can be formed into continuous yarn. This procedure is described in said U.S. Pat. No. 3,760,049.

Rather than firing the green fibers at ambient conditions to remove water and organic material, they can be heated in an autoclave in an inert atmosphere, e.g., $6.9 \times 10^5$ to $138 \times 10^5$ Pa (100–2000 psi) helium, argon, or nitrogen, for example, at 300° to 500° C., in order to form porous refractory fibers. Then, they can be refired in air to remove residual carbon, e.g., at 500° to 900° C., and converted into a refractory ceramic oxide essentially free of carbon. It may be desirable to further fire this porous oxide fiber in a reducing atmosphere which then results in a porous cermet fiber.

The calcining step when done in air volatilizes the balance of the water, decomposes and volatilizes organic material, and burns off carbon, the resultant refractory being an essentially carbon-free ceramic refractory. This calcining heating step also causes some shrinkage which is generally about 50 percent of its volume or more (linear shrinkage generally being less than 25 percent). However, the shape of the fibers during firing remains essentially the same as the unfired fibers and of essentially continuous length. Carbon can be retained by firing in an inert atmosphere.

The refractory material resulting from firing the green fibers at about 900° to 1000° generally comprises crystalline material discernible by x-ray powder diffraction.

In the shaped, fired, refractory multicomponent fibers of the present invention the continuous ceramic matrix component has at least one microcrystalline phase or can be amorphous and convertible to at least one microcrystalline phase on further firing. The matrix component fibers of this invention may also be polycrystalline and contain amorphous species.

The fibers of this invention which have diameters in the range of 1 to 50 micrometers, preferably 5 to 15 micrometers, have properties which enable their use in many environments. These fibers may be exposed to high temperatures (e.g., for prolonged periods at temperatures up to 1150° C. and for short periods for temperatures up to at least 1400° C.) and may remain strong, flexible and continuous. The multicomponent fibers may be subjected to ordinary textile processing to produce multifilament textile structures (e.g., rovings, cords, yarns, etc.) and can be worked into non-woven, woven and knitted fabrics by conventional techniques as either staple or continuous fibers.

The fired fibers are continuous, uniformly round or oval, rod-like, or ribbon-like, strong, flexible, smooth, glossy, refractory, polycrystalline or amorphous. The fibers are useful in making refractory textile fabric or as fillers or reinforcement for plastic composites.

As mentioned above, to spin the internally modified multicomponent fibers of the invention requires the rheological properties of precursor liquids to be controlled so as to ensure the obtaining of the desired shape of the second phase. Additionally, the solvents (i.e., (1) water or water-miscible or (2) nonpolar organic solvents such as benzene dioxane, diethylether, mineral spirits, toluene, ethyl n-propyl ether, ethyl isopropyl ether, tetrahydrofuran, a xylene, or a mixture thereof) and other sol components require a degree of incompatability to ensure the formation of a ceramic matrix phase and at least one in situ-generated discontinuous ceramic or metal phase.

Multicomponent fibers are highly desirable for many uses because they may be magnetic, absorb electromagnetic radiation, or can be used as catalysts or supports, or filler or pigments. These properties and others result from the different physical properties of the components in the multiphase fiber. The fibers are particularly useful for high temperture insulation, as catalyst supports, as an open substrate to be infiltrated by resins, glasses or metals, or mixed with ceramics in a composite. When the discontinuous phase contains metal oxide, firing the fibers in a reducing atmosphere such as hydrogen may provide a fiber with magnetic properties or which is attractive to a magnet.

With the multicomponent fibers new dimensions of ceramic fibers are available. A wide range of combinations are available to impart a wide range of properties to meet specialty needs of ceramic fibers.

Objects and advantages of this invention are further illustrated by the following examples, but the particular materials and amounts thereof recited in these examples, as well as other conditions and details, should not be construed to unduly limit this invention. Unless otherwise specified all parts and percentages are by weight.

EXAMPLE 1

A basic alumina-boria-silica 3:1:2 (ABS 3-1-2) sol having a molecular equivalent oxide ratio of $3Al_2O_3:1-B_2O_3:2SiO_2$ was prepared as follows:

Using a magnetic stirrer in a beaker, components 1) to 4) were added in order:
1) 108.6 g of a solution of boric acid-stabilized aluminum acetate having 7% equivalent oxide content with an $Al_2O_3:B_2O_3$ molecular ratio of 3/1
2) 3.50 g lactic acid
3) 6.98 g silica sol (Nalco 1034A ™, Nalco Chemical Company, Chicago Ill.)
4) 2.9 g dimethyl formamide (DMF).

The mixture was then filtered through a 0.3 micrometer Balston ™ cartridge filter (Balston, Inc., Lexington, Mass.) and 1 micrometer Millipore ™ membrane disc filter (Millipore Corp., Bedford, Mass.) into a 200-mL round-bottomed flask, to be concentrated in a rotating evacuated flask (Rotavapor ™, Buchi, Switzerland) to a viscous sol. To a portion of this viscous sol, concentrated to an equivalent oxide content of 16 percent by weight, was added a small amount of a magnetic liquid comprising 5 g nickel sol having 40 percent Ni content by weight [CEM-ALL ™, Mooney Chemical, Inc., Cleveland, Ohio], and 12.68 g iron sol having a 30 percent metal content by weight [CEM-ALL]. The magnetic liquid was dispersed as droplets into the basic alumina-boria-silica (ABS 3-1-2) sol. This mixture was further concentrated to a viscosity of about 75,000 cps and was spun through a spinnerette having thirty 76-micrometer (3 mil) holes. The fibers had magnetic fibrils within the 3-1-2 fiber matrix. This exemplifies a new form of multicomponent fibers. When these fibers were fired in a reducing atmosphere, the fibers had magnetic properties. The second phase fibrils were 2 to 6 micrometers in length and had diameters of 1 to 3 micrometers. The total metal content was about 2 percent by weight of the fiber composition.

EXAMPLE 2

In a round bottom flask, to 100 grams of the ABS 3-1-2 basic sol having an equivalent oxide content of 16 weight percent was added about 2 grams of 30% iron sol, Mooney Chemical CEM-ALL ™. The flask was attached to a Rotavapor ™ rotating evacuated flask (Buchi. Switzerland) to disperse the iron sol into the 3-1-2 basic sol. Iron sol solvent evaporation and degassing was evidenced by foaming. The iron sol was evenly dispersed as tiny droplets throughout the 3-1-2 matrix sol. The sol mixture was spun through a spinnerette having thirty 76-micrometer (3 mil) holes. The resulting fibers had a string of iron "pearls" about 1 micrometer in diameter down the fiber. The spinning conditions and sol viscosities maintained the tiny spheres rather than making the fibrils. This is another example demonstrating a form of multi-component fibers. When the fibers were fired in a reducing atmosphere the iron remained as metal. The composition of the resulting fiber was 96.6 weight percent ABS 3-1-2 and 3.4 weight percent Fe.

EXAMPLE 3

Sixty g of ABS 3-1-2 concentrate having a viscosity of 75,000 cps (about 30% oxide solids equivalent after calcination) were diluted with water to a solids equivalent of about 11% by weight. Six-tenths of a gram of iron naphthanate solution having an equivalent metal content of 6 weight percent was dispersed in the 312 diluted sol by stirring so as to form droplets in the 312 matrix sol. The mixture was concentrated in a rotating evacuated flask (Rotavapor ™, Buchi, Switzerland) to viscosity of about 75,000 cps and extruded through a spinnerette having thirty 102-micrometer (4 mil) holes. The extruded fibers were collected on a round paper container about 1 meter below the spinnerette and were dried by infra-red lamps as they passed between the spinnerette and the collector. These fibers were fired in air from room temperature to 850° C. over two hours time. After heat treatment for ½ hour, the fibers were withdrawn from the furnace and examined under an optical microscope. Dark brown fibrils about 3 to 6 micrometers long and 1 to 6 micrometers in diameter, oriented in a lengthwise direction, were observed to be within the fibers. Most of the iron oxide material was in a fibril form but in several cases strings of spherical particles or continuous lines of connected spheroidal shapes were present. The resulted fibers were not attracted to a magnet.

EXAMPLE 4

A $TiO_2$ sol was prepared according to the teaching of U.S. Pat. No. 4,166,147. TPT (tetraisopropyltitanate), 560 g., was added slowly to 100 g. concentrated HCl (37%) with continuous cooling with tap water to control reaction rate. The resulting yellowish sol was dried in air at room temperature to a gel containing approx. 62% by wt. $TiO_2$. Then about 50 g of the dry gel was dissolved in 200 mL deionized water. The clear sol obtained was filtered through a no. 54 Whatman filter paper. The filtered sol, with a pH less that 1.0 was then partially concentrated, using a Rotovapor flask, to a viscosity of about 50,000 cps. To this sol, about 2.0 g of copper naphthenate (equivalent to 0.15 g CuO) was added with stirring. The resulting mixture as concentrated to a viscosity of about 80,000 cps and then extruded and drawn through a spinnerette having thirty 102-micrometer (4 mil) holes. The drawn filamets were collected on a 17.5 cm diameter drum. Hanks of filaments were cut from the resulting bundle and fired from room temperature to 550° C. in air over a period of one hour. The resulting fibers had lines of spheroidal particles as well as fibrils dispersed in a $TiO_2$ ceramic matrix.

EXAMPLE 5

Fibers were prepared in the same manner as Example 3, except that 0.6 g of cobalt naphthenate solution having an equivalent metal content of 6% cobalt was used. The extruded fibers were fired in air from room temperature to 900° C. and cooled to room temperature over two hours. The fibers were removed from the furnace and observed under an optical microscope. Within the fibers a second dark blue cobalt oxide phase was present as a string of spherical particles and fibrils, oriented in a lengthwise direction.

Various modifications and alterations of this invention will become apparent to those skilled in the art without departing from the scope and spirit of this invention, and it should be understood that this invention is not to be unduly limited to the illustrative embodiments set forth herein.

I claim:

1. A method for forming a fiber comprising a continuous ceramic precursor first phase and at least one discontinuous precursor second phase, which provides at least one phase selected from the group consisting of metal and ceramic the diameter of said second phase being at least one micrometer, the second phase being a string of spherical particles, a line of connected spheroidal shapes, or fibrils, all of which are oriented in a lengthwise direction, said first and second phases being derived from immiscible precursor liquids, which method comprises the steps of:
   a) preparing an emulsified viscous concentrate of immiscible precursor ceramic liquids or ceramic/metal precursor liquid, said concentrate being a blend of precursor liquids,
   b) shaping said viscous concentrate into a fiber by drawing or spinning,
   c) evaporatively gelling or hydrolyzing the resultant formed fiber to provide a non-refractory fiber of heterogeneous composition.

2. The method according to claim 1 further comprising the step:

d) firing said formed non-refractory fiber to convert it into a refractory fiber of heterogeneous composition.

3. The method according to claim 1 further comprising the step of firing said fiber in a reducing atmosphere to provide a cermet fiber.

4. The method according to claim 2 further comprising the step of firing said fiber in a reducing atmosphere to provide a cermet fiber.

5. The method, according to claim 1 wherein said second phase of said fiber is present in the range of 0.05 to 3 weight percent.

6. The method according to claim 2 wherein said second phase of said fiber is present in an amount in the range of 0.05 to 3 weight percent.

7. A method for forming an article having a heterogenous composition comprising a continuous ceramic precursor first phase and in the range of 0.05 to 50 weight percent of a discontinuous precursor second phase which provides at least one phase selected from the group consisting of metal and ceramic, the diameter of said second phase being at least one micrometer, the second phase being a string of spherical particles, a line of connected spheroidal shapes, or fibrils, all of which are oriented in one direction, said first and second phases being derived from immiscible precursor liquids, which method comprises the steps of:
   a) preparing an emulsified viscous concentrate of immiscible precursor ceramic liquids or ceramic/metal precursor liquids, said concentrate being a blend of said precursor liquids,
   b) shaping said viscous concentrate into an article, and
   c) evaporatively gelling or hydrolyzing the resultant article to provide a non-refractory article of heterogeneous composition.

8. The method according to claim 7 further comprising the step:
   d) firing said non-refractory article to convert it into a refractory article.

9. The method according to claim 7 wherein said article is a fiber.

10. The method according to claim 7 wherein said article is a granule or flake.

11. The method according to claim 2 wherein said second phase of said fiber is present in an amount in the range of 0.05 to 10 weight percent.

12. The method according to claim 8 wherein said second phase of said article is present in an amount in the range of 0.05 to 10 weight percent.

13. The method according to claim 7 further comprising the step of firing said article in a reducing atmosphere to provide a cermet article.

14. The method according to claim 8 further comprising the step of firing said article in a reducing atmosphere to provide a cermet article.

15. The method according to claim 8 wherein said article is a particle.

16. The method according to claim 8 wherein said article is a fiber.

17. The method according to claim 8 wherein said article is a granule or flake.

18. A method for forming an article having a heterogenous composition comprising a continuous ceramic precursor first phase and in the range of 0.05 to 50 weight percent of a discontinuous precursor second phase which provides at least one phase selected from the group consisting of metal and ceramic, the diameter of said second phase being at least one micrometer, the second phase being at least one of randomly arranged beads and elongated particles, said first and second phases being derived from immiscible precursor liquids, which method comprises the steps of:
   a) preparing an emulsified viscous concentrate of immiscible precursor ceramic liquids or ceramic/metal precursor liquids, said concentrate being a blend of said precursor liquids,
   b) shaping said viscous concentrate into an article, and
   c) evaporatively gelling or hydrolyzing the resultant article to provide a non-refractory article of heterogeneous composition.

19. The method according to claim 18 further comprising the step of firing said non-refractory article to convert it into a refractory article.

20. The method according to claim 18 further comprising the step of firing said article in a reducing atmosphere to provide a cermet article.

21. The method according to claim 1 wherein said article is a fiber.

22. The method according to claim 19 wherein said article is a granule or flake.

* * * * *